(12) United States Patent
Kawai et al.

(10) Patent No.: US 9,423,778 B2
(45) Date of Patent: Aug. 23, 2016

(54) INTERMEDIATE APPARATUS
(71) Applicant: DAIKIN INDUSTRIES, LTD., Osaka-shi, Osaka (JP)
(72) Inventors: Seiji Kawai, Kusatsu (JP); Nanae Kinugasa, Kusatsu (JP)
(73) Assignee: Daikin Industries, Ltd., Osaka (JP)
( * ) Notice: Subject to any disclaimer, the term of this patent is extended or adjusted under 35 U.S.C. 154(b) by 187 days.
(21) Appl. No.: 14/361,813
(22) PCT Filed: Nov. 27, 2012
(86) PCT No.: PCT/JP2012/080594
§ 371 (c)(1),
(2) Date: May 30, 2014
(87) PCT Pub. No.: WO2013/080961
PCT Pub. Date: Jun. 6, 2013
(65) Prior Publication Data
US 2014/0330445 A1    Nov. 6, 2014
(30) Foreign Application Priority Data

Dec. 1, 2011   (JP) ................................ 2011-263794

(51) Int. Cl.
  *G05B 13/02*   (2006.01)
  *G06Q 50/06*   (2012.01)
  (Continued)
(52) U.S. Cl.
  CPC ............... *G05B 13/02* (2013.01); *G05B 15/02* (2013.01); *G06Q 10/0637* (2013.01); *G06Q 30/0206* (2013.01); *G06Q 50/06* (2013.01); *H02J 4/00* (2013.01)
(58) Field of Classification Search
  USPC ................................... 700/276, 94, 275, 295
  See application file for complete search history.

(56) References Cited

U.S. PATENT DOCUMENTS 8,595,379 B1 * 11/2013 Brandwine ........... G06F 1/3203
                                                          709/224

2004/0117330 A1 * 6/2004 Ehlers .................. F24F 11/0012
                                                          705/412
(Continued)

FOREIGN PATENT DOCUMENTS

EP    2 296 112 A2    3/2011
EP    2 383 864 A2    11/2011
(Continued)

OTHER PUBLICATIONS

International Preliminary Report of corresponding PCT Application No. PCT/JP2012/080594.
(Continued)

*Primary Examiner* — Kidest Bahta
(74) *Attorney, Agent, or Firm* — Global IP Counselors

(57) ABSTRACT

An intermediate apparatus manages a plurality of lower-level apparatuses, and includes an individual adjustable amount receiving unit, a memory unit storing lower-level apparatus management information, a total adjustable amount calculation unit, a demand adjustment request receiving unit, an allocation unit, and an individual request unit sending an individual demand adjustment request to the lower-level apparatus. The individual adjustable amount receiving unit receives notification of an individual adjustable amount from each of the lower-level apparatuses. The total adjustable amount calculation unit calculates a total adjustable amount being a total of the individual adjustable amounts of the plurality of lower-level apparatuses. The demand adjustment request receiving unit receives a demand adjustment request from a higher-level apparatus. The allocation unit allocates a demand adjustment amount to die lower-level apparatus according to a prescribed order based on the lower-level apparatus management information, based on the demand adjustment request.

5 Claims, 7 Drawing Sheets

(51) Int. Cl.
  *G06Q 30/02* (2012.01)
  *G05B 15/02* (2006.01)
  *H02J 4/00* (2006.01)
  *G06Q 10/06* (2012.01)

(56) References Cited

U.S. PATENT DOCUMENTS

| | | | | |
|---|---|---|---|---|
| 2005/0159849 | A9* | 7/2005 | Johnson | G06Q 50/06 700/291 |
| 2010/0070091 | A1* | 3/2010 | Watson | G06Q 50/06 700/728 |
| 2011/0047418 | A1* | 2/2011 | Drees | G05B 15/02 714/57 |
| 2011/0060476 | A1* | 3/2011 | Iino | H02J 3/14 700/297 |
| 2011/0112701 | A1* | 5/2011 | Johnson | G01D 4/002 700/295 |
| 2011/0218690 | A1 | 9/2011 | O'Callaghan et al. | |
| 2012/0330469 | A1 | 12/2012 | Kinugasa et al. | |

FOREIGN PATENT DOCUMENTS

| | | |
|---|---|---|
| JP | 2009-124885 A | 6/2009 |
| JP | 2010-224809 A | 10/2010 |
| JP | 2011-59939 A | 3/2011 |
| JP | 2011-193577 A | 9/2011 |
| WO | 2011/029137 A2 | 3/2011 |

OTHER PUBLICATIONS

International Search Report of corresponding PCT Application No. PCT/JP2012/080594.
European Search Report of corresponding EP Application No. 12 85 3345.2 dated Jul. 31, 2015.

* cited by examiner

| | LOWER-LEVEL CONTROLLER NAME | NUMBER OF TIMES OF ALLOCATION |
|---|---|---|
| 1 | LOWER-LEVEL CONTROLLER #5 | 1 |
| 2 | LOWER-LEVEL CONTROLLER #2 | 2 |
| 3 | LOWER-LEVEL CONTROLLER #4 | 3 |
| 4 | LOWER-LEVEL CONTROLLER #1 | 4 |
| 5 | LOWER-LEVEL CONTROLLER #3 | 5 |
| ... | ... | ... |

INTERMEDIATE APPARATUS

CROSS-REFERENCE TO RELATED APPLICATIONS

This U.S. National stage application claims priority under 35 U.S.C. §119(a) to Japanese Patent Application No. 2011-263794, filed in Japan on Dec. 1, 2011, the entire contents of which are hereby incorporated herein by reference.

TECHNICAL FIELD

The present invention relates to an intermediate apparatus.

BACKGROUND ART

Environmental concerns have come to prompt an increase in the proportion of energy derived from natural sources.

However, natural energy tends to be influenced by changes in climate. Power companies thus need to have reserve power-generation facilities in order to realize stable supply, and the cost of energy supply increases.

Demand response is a contrivance by which a consumer side is requested to adjust an amount of demand in correspondence with variation of the amount of supply in order to handle such cost increase. For example, Japanese Laid-open Patent Application No. 2011-193577 proposes a lower-level apparatus in which an amount of demand is adjusted during a prescribed period in order to suppress the amount of energy increasing in accordance with a season and/or time period. The consumer can obtain a discount or other incentive by thus complying with the request for demand response from the power company.

DISCLOSURE

Problem to be Solved by the Invention

Incidentally, in order to efficiently adjust the amount of demand, it is efficient to impose adjustment of the amount of demand on consumers having a large scale of demand. In this case, consumers having a small scale of demand have few opportunities to participate in demand response and high possibility to lose opportunities to obtain incentive. In such case, there is no longer a motivation to participate in demand response for many of the consumers, and the adjustable amount of demand is also expected to be limited.

An object of the present invention, therefore, is to provide an intermediate apparatus that compiles amounts of demand being adjustable by a plurality of lower-level apparatuses and provides opportunities to participate in demand response to consumers associated with each lower-level apparatus as fairly as possible.

Means for Solving the Problem

The intermediate apparatus according to a first aspect of the present invention is an intermediate apparatus for managing a plurality of lower-level apparatuses managing one or two or more pieces of facility equipment, and comprises an individual adjustable amount receiving unit, a memory unit, a total adjustable amount calculation unit, a demand adjustment request receiving unit, an allocation unit, and an individual request unit. The individual adjustable amount receiving unit receives notification of an individual adjustable amount which is an adjustable amount of energy consumption for each prescribed period from each lower-level apparatus. The memory unit stores the individual adjustable amount of each lower-level apparatus, and lower-level apparatus management information being information related to each lower-level apparatus. The total adjustable amount calculation unit calculates a total adjustable amount which is a total of the individual adjustable amounts of the plurality of lower-level apparatuses. The demand adjustment request receiving unit receives a demand adjustment request requesting adjustment of an amount of energy consumption during an adjustment request period from a higher-level apparatus, which is a higher-level energy management apparatus. The allocation unit allocates, on the basis of the demand adjustment request, a demand adjustment amount to one or a plurality of lower-level apparatuses according to a prescribed order based on the lower-level apparatus management information. The individual request unit sends an individual demand adjustment request requesting adjustment of an amount of energy consumption by an amount of the demand adjustment amount to the lower-level apparatus to which the demand adjustment amount is allocated by the allocation unit.

In the intermediate apparatus according to the first aspect of the present invention, the individual adjustable amount receiving unit receives notification of the individual adjustable amount, being the adjustable amount of energy consumption for each prescribed period, from each lower-level apparatus. The memory unit stores the individual adjustable amount of each lower-level apparatus, and the lower-level apparatus management information, being the information related to each lower-level apparatus. The total adjustable amount calculation unit calculates the total adjustable amount, being the total of the individual adjustable amounts of the plurality of lower-level apparatuses. The demand adjustment request receiving unit receives the demand adjustment request, requesting adjustment of the amount of energy consumption during the adjustment request period, from the higher-level apparatus, being a higher-level energy management apparatus. The allocation unit allocates the demand adjustment amount to one or a plurality of lower-level apparatuses according to the prescribed order based on the management information, on the basis of the demand adjustment request. The individual request unit sends the individual demand adjustment request, requesting adjustment of the amount of energy consumption by an amount of the demand adjustment amount, to the lower-level apparatus to which the demand adjustment amount is allocated by the allocation unit. It is thereby possible to compile amounts of demand being adjustable by a plurality of lower-level apparatuses and to provide opportunities to participate in demand response to consumers associated with each lower-level apparatus as fairly as possible.

"Amount of energy consumption" means an amount of energy consumed. "Energy" means, for example, electricity, and "amount of energy" means, for example, power expressed in units of watts, or the like, or an amount of power expressed in units of watt-hours, or the like.

The intermediate apparatus according to a second aspect of the present invention is the intermediate apparatus according to the first aspect, further comprising a total adjustable amount notification unit. The total adjustable amount notification unit gives notification of the total adjustable amount to the higher-level apparatus.

In the intermediate apparatus according to the second aspect of the present invention, the total of the adjustable amounts of power consumption of the plurality of lower-level apparatuses under management can be notified to the higher-level apparatus.

The intermediate apparatus according to a third aspect of the present invention is the intermediate apparatus according to the first or second aspect, wherein the lower-level apparatus management information includes information about the last lower-level apparatus in the prescribed order that the demand adjustment amount was allocated in a preceding time by the allocation unit. The allocation unit allocates the demand adjustment amount to the lower-level apparatus according to the prescribed order, starting from the next lower-level apparatus following the last lower-level apparatus.

In the intermediate apparatus according to the third aspect of the present invention, the lower-level apparatus allocated lastly in the preceding time is stored. The demand adjustment amount can thereby be allocated to a lower-level apparatus which was not allocated in the preceding time when the demand adjustment amount is allocated to a lower-level apparatus next time.

The intermediate apparatus according to a fourth aspect of the present invention is the intermediate apparatus according to the third aspect, wherein the prescribed order is an order in which the lower-level apparatus is registered in the lower-level apparatus management information.

In the intermediate apparatus according to the fourth aspect of the present invention, the opportunities to participate in demand response can be provided to the consumers as fairly as possible according to the order in which the lower-level apparatus is registered in the lower-level apparatus management information.

The intermediate apparatus according to a fifth aspect of the present invention is the intermediate apparatus according to the third aspect, wherein the lower-level apparatus management information further includes information related to a priority order associated with each lower-level apparatus. The prescribed order is the priority order.

In the intermediate apparatus according to the fifth aspect of the present invention, the demand adjustment amount can be allocated according to the prescribed priority order. "Prescribed priority order" means, for example, a priority order defined by a contract amount, or the like. The opportunities to participate in demand response can thereby be provided to the consumers according to the priority order as fairly as possible.

The intermediate apparatus according to a sixth aspect of the present invention is the intermediate apparatus according to the first or second aspect, wherein the lower-level apparatus management information includes information related to the number of times of allocation in which the allocation unit previously allocated the demand adjustment amount to each lower-level apparatus. The prescribed order is an ascending order of the number of times of allocation.

In the intermediate apparatus according to the sixth aspect of the present invention, the demand adjustment amount is allocated in an ascending order of the number of times of allocation. The opportunities to participate in demand response can thereby be provided to the consumers as fairly as possible.

The intermediate apparatus according to a seventh aspect of the present invention is the intermediate apparatus according to the third aspect, wherein the lower-level apparatus management information further includes information related to a priority order associated with each lower-level apparatus, and information related to the number of times of allocation in which the allocation unit previously allocated the demand adjustment amount to each lower-level apparatus. The prescribed order is an order in which the lower-level apparatus is registered in the lower-level apparatus management information, the priority order, an ascending order of the number of times of allocation, or an order being a combination of any two or more of the above.

In the intermediate apparatus according to the seventh aspect of the present invention, the opportunities to participate in demand response can be provided to the consumers as fairly as possible.

Effects of the Invention

In the intermediate apparatus according to the first aspect of the present invention, amounts of demand being adjustable by a plurality of lower-level apparatuses can be compiled and opportunities to participate in demand response can be provided to consumers associated with each lower-level apparatus as fairly as possible.

In the intermediate apparatus according to the second aspect of the present invention, the total of the adjustable amounts of power consumption of the plurality of lower-level apparatuses under management can be notified to the higher-level apparatus.

In the intermediate apparatus according to the third, sixth, or seventh aspect of the present invention, opportunities to participate in demand response can be provided to the consumers as fairly as possible.

In the intermediate apparatus according to the fourth aspect of the present invention, opportunities to participate in demand response can be provided to the consumers as fairly as possible according to the order in which the lower-level apparatus is registered in the management information.

In the intermediate apparatus according to the fifth aspect of the present invention, opportunities to participate in demand response can be provided to all of the consumers to the extent possible according to the priority order.

DESCRIPTION OF EMBODIMENTS

Figure 1:
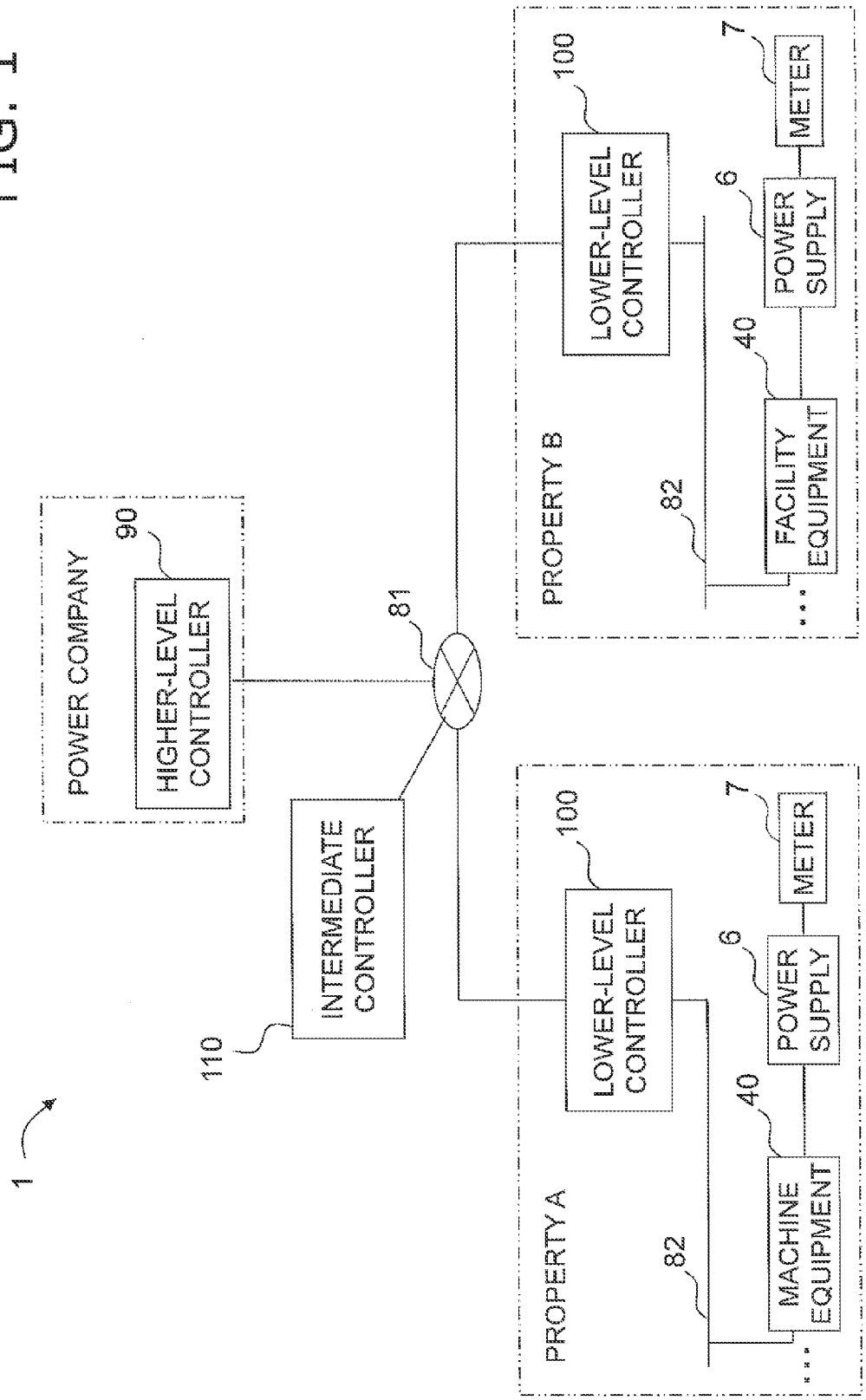
FIG. 1 is a general configuration diagram of a demand adjustment system including an intermediate controller according to the present invention.

One embodiment of the intermediate apparatus according to the present invention is descried below while referring to the drawings.

(1) OVERALL CONFIGURATION

FIG. 1 is a general configuration diagram of a demand adjustment system 1 including an intermediate controller 110 as one example of the intermediate apparatus of the present invention.

The demand adjustment system 1 mainly includes a higher-level controller 90, an intermediate controller 110, and a lower-level controller 100.

A lower-level controller 100 is disposed at properties A and B, being buildings, plants, and/or other structures, and manages the amount of energy consumption of one or two or more pieces of facility equipment 40, . . . disposed within those properties A and B. The facility equipment 40, . . . includes, for example, an air conditioner, water heater, illumination, or the like. A power supply 6 for supplying energy to each piece of facility equipment 40, . . . and a meter 7 for metering energy supplied from the power supply 6 to each piece of facility equipment 40, . . . are additionally placed at each property A and B. The lower-level controller 100, the facility equipment 40, . . . , and the meter 7 are connected by a LAN or other communication network 82. Each piece of facility equipment 40, . . . has a control unit. The lower-level controller 100 controls each piece of facility equipment 40, . . . , and adjusts the amount of energy consumption by transmitting instructions to the control unit via the communication network 82. "Amount of energy consumption" means an amount of energy consumed. "Energy" means, for example, electricity, and "amount of energy" means, for example, power expressed in units of watts, or the like, or an amount of power expressed in units of watt-hours, or the like.

The intermediate controller 110 is an apparatus that is connected with the lower-level controller 100 and the higher-level controller 90 via the Internet or another communication network 81, and mediates between the lower-level controller 100 and the higher-level controller 90 concerning adjustment of the amount of energy consumption. Specifically, a suppressible amount of energy is collected from each lower-level controller 100, and notification of the collected suppressible amount of energy is given to the higher-level controller. When received a demand adjustment request requesting adjustment of the amount of energy consumption from the higher-level controller, the suppressed amount of the amount of energy consumption, that is, a demand adjustment amount is allocated to the lower-level controllers 100 so as to comply with the demand adjustment request.

The higher-level controller 90 manages the energy supplied to a plurality of properties including properties A and B, by adjusting the amount of supply to the demand for energy at these properties. Various kinds of information related to energy supply and demand are transmitted and received between the higher-level controller 90 and the intermediate controller 110.

For example, a power company transmits from the higher-level controller 90 to the intermediate controller 110 a demand adjustment request requesting to suppress the amount of energy consumption, that is, to adjust the energy demand, during a prescribed adjustment request period. Here, the content of the demand adjustment request, that is, the suppressed amount of the amount of energy consumed by the entirety of the facility equipment 40, . . . at the properties A and B is referred to as the "requested suppressed amount of energy." The upper limit of the consumable amount of energy for achieving the requested suppressed amount of energy is referred to as the "requested amount of energy." The requested suppressed amount of energy is a value determined on the basis of the suppressible amount of energy which the intermediate controller 110 integrated the suppressible amount of energy reported by each lower-level controller 100, but the value may also be determined independently by the higher-level controller 90.

(2) DETAILED CONFIGURATION OF THE INTERMEDIATE CONTROLLER 110

Figure 2:
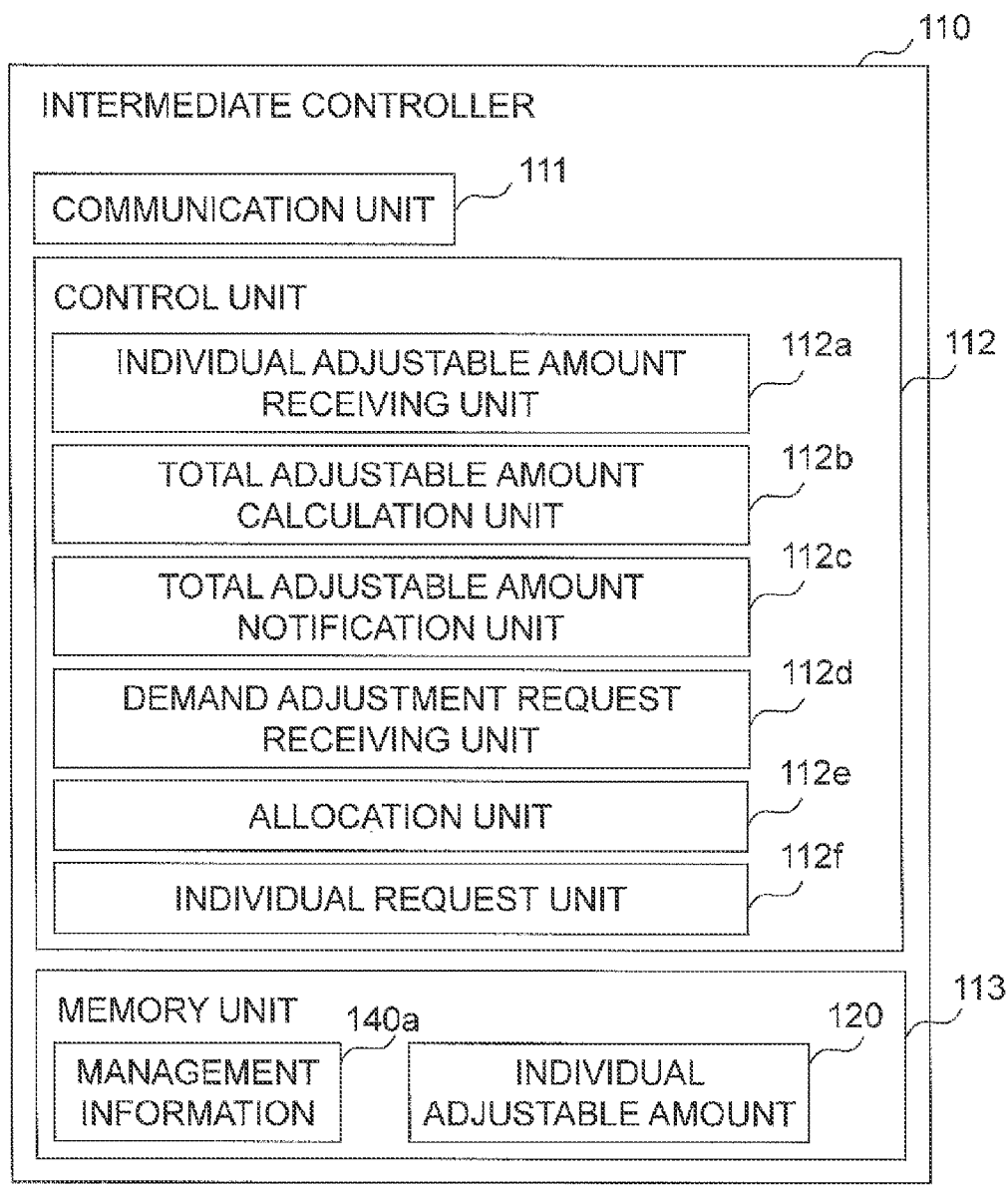
FIG. 2 is a general configuration diagram of the intermediate controller according to the present invention.

FIG. 2 is a general configuration diagram of the intermediate controller 110. The intermediate controller 110 mainly comprises a communication unit 111, a control unit 112, and a memory unit 113.

(2-1) Communication Unit

The communication unit 111 is an interface for making the intermediate controller 110 connectable with communication networks 81 and 82 using Ethernet®, or the like.

(2-2) Memory Unit 113

The memory unit 113 mainly comprises a RAM, ROM, hard disk, and the like, and stores various kinds of information including an individual adjustable amount 120 of each lower-level controller 100, management information 140*a* being information related to each lower-level controller 100, an intermediate controller program and the like.

(2-3) Control Unit 112

The control unit 112 mainly comprises a CPU, and executes the intermediate controller program stored in the memory unit 113. The control unit functions as an individual adjustable amount receiving unit 112*a*, a total adjustable amount calculation unit 112*b*, a total adjustable amount notification unit 112*c*, a demand adjustment request receiving unit 112*d*, an allocation unit 112*e*, an individual request unit 112*f*, and the like, by execution of the intermediate controller program.

The functions of the control unit 112 are described below.

(2-3-1) Individual Adjustable Amount Receiving Unit 112*a*

The individual adjustable amount receiving unit 112*a* receives notification of the individual adjustable amount 120, being the adjustable amount of energy consumption for each prescribed period (for example, one hour), from each lower-level controller 100. Specifically, each lower-level controller 100 calculates an adjustable amount of energy consumption (individual adjustable amount 120) for each prescribed period (for example, one hour) of the entirety of the facility equipment 40, . . . managed by itself and transmits it to the intermediate controller 110. When the communication unit 111 of the intermediate controller 110 receives that individual adjustable amount 120, the individual adjustable amount receiving unit 112*a* stores that individual adjustable amount in the memory unit 113.

(2-3-2) Total Adjustable Amount Calculation Unit 112*b*

The total adjustable amount calculation unit 112*b* calculates a total adjustable amount being the total of the individual adjustable amounts 120 of a plurality of lower-level controllers 100 under management of the intermediate controller 110. Specifically, the total adjustable amount calculation unit 112*b* calculates the total adjustable amount by totalizing all of the individual adjustable amounts 120 pertaining to the lower-level controllers 100 stored in the memory unit 113. That is, the individual adjustable amounts 120 of the lower-level controllers 100 which are related to the consumers who wish to participate in demand response and have given notification of the individual adjustable amount 120, are totalized.

(2-3-3) Total Adjustable Amount Notification Unit 112*c*

The total adjustable amount notification unit 112*c* gives notification of the total adjustable amount to the higher-level controller 90, being a higher-level energy management apparatus. Specifically, the total adjustable amount notification unit 112*c* causes the communication unit 111 to transmit the total adjustable amount to the higher-level controller 90 via the communication network 81.

(2-3-4) Demand Adjustment Request Receiving Unit 112*d*.

The demand adjustment request receiving unit 112*d* receives from the higher-level controller 90 the demand adjustment request requesting adjustment of the amount of energy consumption during the adjustment request period. Specifically, when the communication unit 111 receives the demand adjustment request, the demand adjustment request receiving unit 112*d* stores the demand adjustment request in the memory unit 113, and causes the allocation unit 112*e* to start allocation processing to be described.

(2-3-5) Allocation Unit 112*e*

The allocation unit 112*e* performs allocation processing to allocate a demand adjustment amount to one or a plurality of lower-level controllers 100 according to a prescribed order based on the management information, on the basis of the demand adjustment request. The allocation processing is described in detail later.

(2-3-6) Individual Request Unit 112*f*

The individual request unit 112*f* sends an individual demand adjustment request requesting adjustment of the amount of energy consumption by an amount of the demand adjustment amount to the lower-level controller 100 to which the demand adjustment amount is allocated by the allocation unit 112*e*. Specifically, the individual request unit 112*f* creates an instruction instructing the lower-level controller 100 to which the demand adjustment amount is allocated by the allocation unit 112*e* to suppress the amount of energy consumption by an amount of the demand adjustment amount, and causes the communication unit 111 to transmit the instruction via the communication network 81 to the lower-level controller 100.

(3) DETAILS OF PROCESSING (3-1) Processing Flow Related to Demand Response

Figure 3:
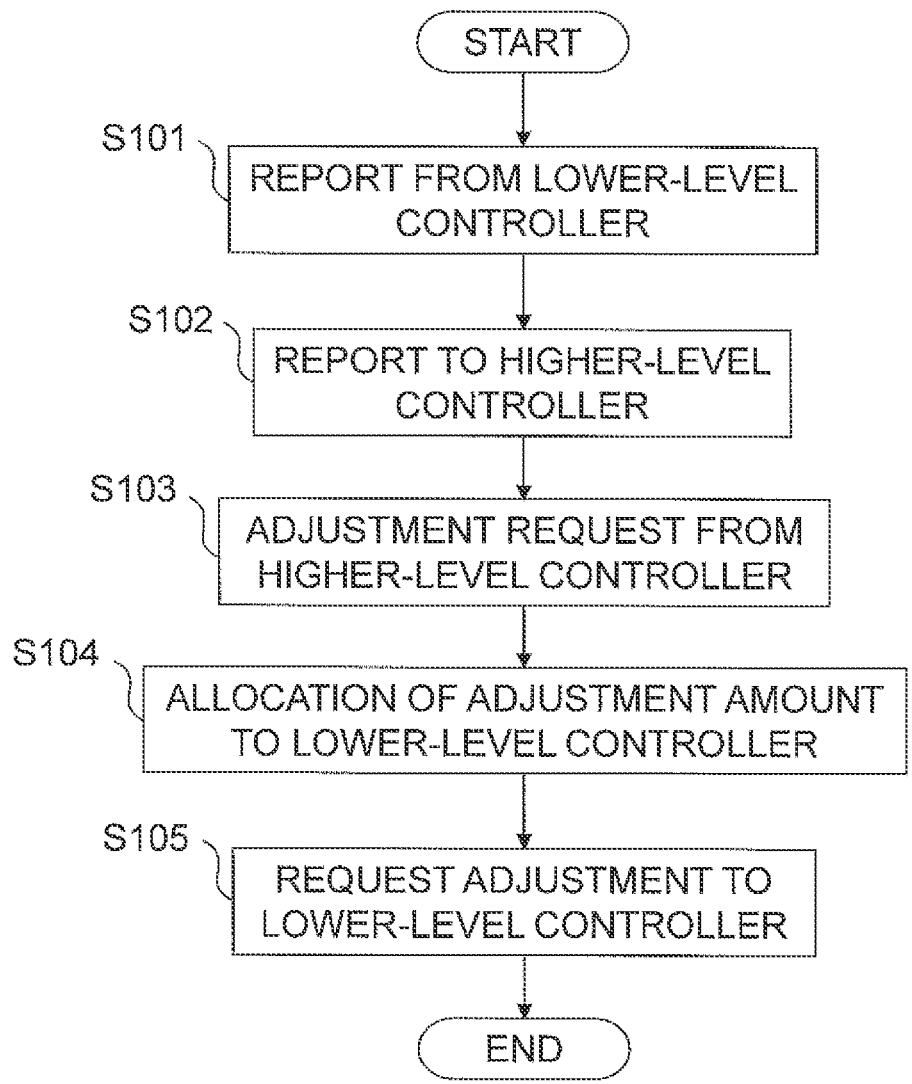
FIG. 3 is a flow chart of processing related to demand response.

FIG. 3 is a flow chart of processing related to demand response in the demand adjustment system 1. The flow of processing related to demand response is described below while referring to FIG. 3.

In step S101, each lower-level controller 100 reports, that is, transmits to the intermediate controller 110 an amount of energy consumption (individual adjustable amount 120) that is suppressible during the prescribed period (for example, one hour). When the communication unit 111 of the intermediate controller 110 receives the individual adjustable amount 120, the individual adjustable amount receiving unit 112*a* stores the individual adjustable amount 120 in the memory unit 113.

In the next step S102, the total adjustable amount calculation unit 112*b* of the intermediate controller 110 calculates a total adjustable amount by totalizing the individual adjustable amounts 120 of the lower-level controllers 100 stored in the memory unit 113. Then, the total adjustable amount notification unit 112*c* causes the communication unit 111 to transmit the total adjustable amount via the communication network 81 to the higher-level controller 90. At this time, the prescribed period pertaining to step S101 is also transmitted to the higher-level controller 90.

In the next step S103, when the communication unit 111 receives a demand adjustment request from the higher-level controller 90, the demand adjustment request receiving unit 112*d* stores the demand adjustment request in the memory unit 113, and arranges for subsequent allocation processing to be started. The higher-level controller 90 determines the requested suppressed amount of energy and the adjustment request period on the basis of the total adjustable amount and the prescribed period pertaining to step S101 transmitted from the intermediate controller 110, and transmits the demand adjustment request including the requested suppressed amount of energy and the adjustment request period to the intermediate controller 110.

In the next step S104, the allocation unit 112*e* allocates a demand adjustment amount to one or a plurality of lower-level controllers 100 on the basis of the demand adjustment request. At this time, the allocation unit 112*e* refers to the management information 140*a* stored in the memory unit 113, and allocates the demand adjustment amount according to a prescribed order based on the management information. The flow of the allocation processing is described below.

In the next step S105, the individual request unit 112*f* creates an instruction (individual demand adjustment request) instructing the lower-level controller 100 to which the demand adjustment amount is allocated by the allocation unit 112*e* to suppress the amount of energy consumption by an amount of the demand adjustment amount during the adjustment request period specified by the demand adjustment request, and arranges for the instruction to be transmitted by the communication unit 111 via the communication network 81 to the lower-level controller 100. The lower-level controller 100 receiving the instruction controls the facility equipment 40, . . . so as to suppress the amount of energy consumption by an amount of the demand adjustment amount specified by the instruction during the adjustment request period.

(3-2) Allocation Processing Flow

Figure 4:
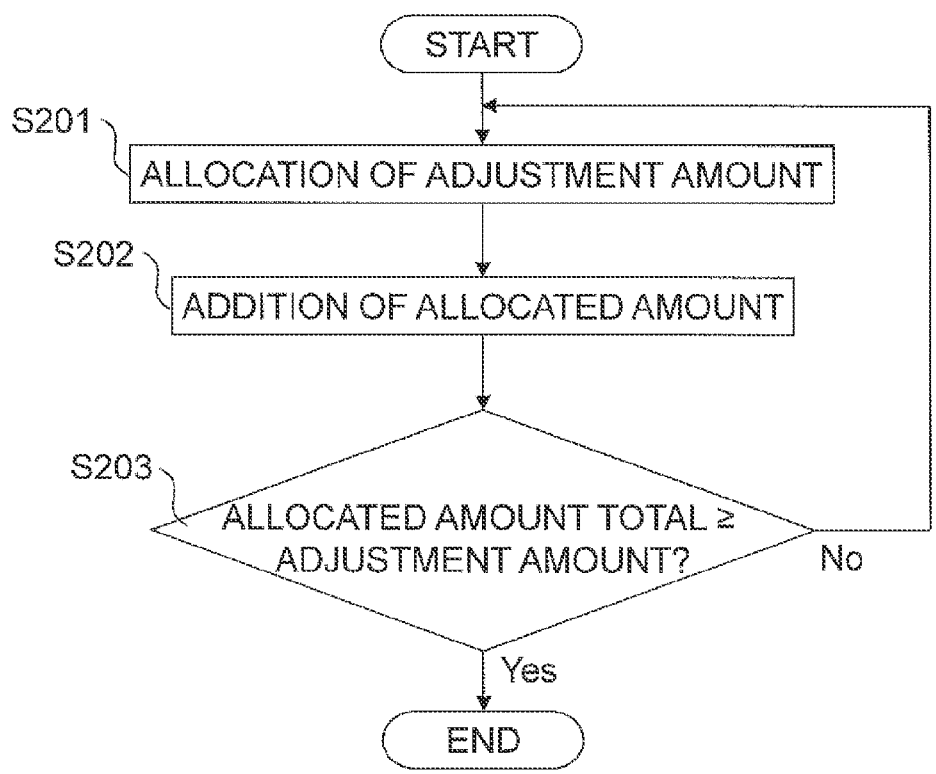
FIG. 4 is a flow chart of allocation processing for allocating a demand adjustment amount to lower-level controllers.

FIG. 4 is a flow chart of allocation processing in which the allocation unit 112*e* allocates a demand adjustment amount to one or a plurality of lower-level controllers 100. The processing flow is described below while referring to FIG. 4.

Figure 5:
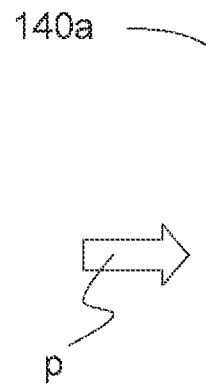
FIG. 5 is an example of management information according to the present invention.

In step S201, the allocation unit 112*e* refers to the management information 140*a* stored in the memory unit 113, and allocates to the lower-level controller 100 the demand adjustment amount according to the prescribed order based on the management information 140*a*. The management information 140*a* includes a list of lower-level controllers 100, for example, as illustrated in FIG. 5. In the list, the lower-level controllers 100 are arranged in the order in which the lower-level controllers were added to the list, that is, registered in the management information 140*a*. A pointer p indicating the lower-level controller 100 to which a demand adjustment amount was allocated lastly in the preceding time in the list is recorded in the management information 140*a*. The allocation unit 112*e* allocates a prescribed amount of the demand adjustment amount to the lower-level controller 100 next in order in the list following the lower-level controller 100 indicated by the pointer p to which a demand adjustment amount was allocated lastly in the preceding time. The pointer p is empty in an initial state in which a demand adjustment amount has not been allocated to any of the lower-level controllers 100. If the pointer p is empty or if the lower-level controller 100 indicated by the pointer p is the last lower-level controller 100 in the list, the demand adjustment amount is allocated to the lower-level controller 100 at the head of the list. The pointer p is updated to indicate the lower-level controller 100 allocated a demand adjustment amount this time. In other words, the demand adjustment amount is allocated by each prescribed amount (for example, 10 kW) to lower-level controller 100 in the order in which the lower-level controller is registered in the management information 140*a*.

In the next step S202, the demand adjustment amount allocated to the lower-level controller 100 in step S101 is added to the allocated amount stored in the memory unit 113. The allocated amount is set to 0 at the initial stage of the allocation processing flow.

In the next step S203, a determination is made as to whether the allocated amount is greater than or equal to the demand adjustment amount specified by the demand adjustment request. For example, if the demand adjustment amount specified by the demand adjustment request from the higher-level controller 90 is 500 kW, then a determination is made as to whether the total of the demand adjustment amounts allocated to the lower-level controllers 100 has reached 500 kW. If yes, the allocation processing flow ends. If no, the flow returns to step S201.

When a demand adjustment request is transmitted from the higher-level controller 90 next time, the demand adjustment amount is allocated in order from the lower-level controller 100 next in order following the lower-level controller 100 to which a demand adjustment amount was lastly allocated in allocation processing in the preceding time.

(4) FEATURES (4-1)

In the abovementioned embodiment, the individual adjustable amount receiving unit 112*a* receives notification of the individual adjustable amount 120, being the adjustable amount of energy consumption for each prescribed period, from each lower-level controller 100. The memory unit 113 stores the individual adjustable amount 120 of each lower-level controller 100, and the management information 140*a*, being the information related to each lower-level controller 100. The total adjustable amount calculation unit 112*b* calculates the total adjustable amount, being the total of the individual adjustable amounts 120 of the plurality of lower-level controllers 100. The demand adjustment request receiving unit 112*d* receives the demand adjustment request requesting adjustment of the amount of energy consumption during the adjustment request period from the higher-level controller 90. The allocation unit 112*e* allocates the demand adjustment amount to one or a plurality of lower-level controllers 100 according to the prescribed order based on the management information 140*a*, on the basis of the demand adjustment request. The individual request unit 112*f* creates the individual demand adjustment request, being an instruction requesting adjustment of the amount of energy consumption by an amount of the demand adjustment amount, and transmits the request via the communication unit 111 to the lower-level controller 100 to which the demand adjustment amount is allocated by the allocation unit 112*e*. It is thereby possible to compile amounts of demand being adjustable by a plurality of lower-level controllers 100 and to provide opportunities to participate in demand response to consumers associated with each lower-level controller 100 as fairly as possible.

(4-2)

In the above embodiment, the total adjustable amount notification unit 112*c* gives notification of the total adjustable amount to the higher-level controller 90, being the higher-level energy management apparatus. Notification of the total of the adjustable amounts of power consumption of the plurality of lower-level controllers 100 under management can thereby be given to the higher-level controller 90.

(4-3)

In the above embodiment, the lower-level controller 100 lastly allocated in the preceding time is stored in a pointer p. A demand adjustment amount can thereby be allocated to a lower-level controller 100 unallocated in the preceding time when a demand adjustment amount is allocated to a lower-level controller 100 next time. Accordingly, opportunities to participate in demand response can be provided to the consumers as fairly as possible.

(4-4)

In the above embodiment, opportunities to participate in demand response can be provided as fairly as possible to the consumers in the order in which the lower-level controller 100 is registered in the management information 140*a*.

(5) MODIFIED EXAMPLES

(5-1) Modified Example 1A

Figure 6:
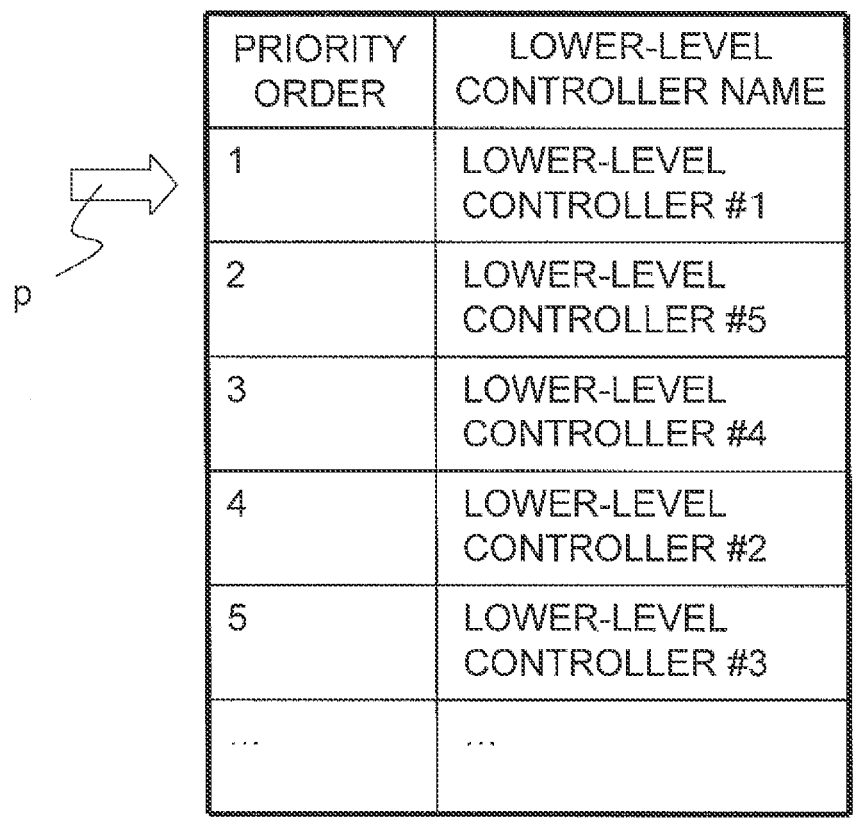
FIG. 6 is an example of management information according to a modified example 1A of the present invention.

In the above embodiment, the allocation unit 112*e* allocates the demand adjustment amount to the lower-level controllers 100 in the order in which the lower-level controller is registered in the management information 140*a*. However, in another embodiment, a plurality of lower-level controllers 100 may be listed in a prescribed priority order. That is, the demand adjustment amount may be allocated to the lower-level controller 100 in the prescribed priority order. In this case, the plurality of lower-level controllers 100 are listed, for example, as in the list (management information 140*b*) illustrated in FIG. 6, and the demand adjustment amount is allocated in this order. When it reaches the last in the list (management information 140*b*), the demand adjustment is allocated after returning to the head.

"Prescribed priority order" means, for example, an order of priority in business, including by contract amount, and the like.

Opportunities to participate in demand response can thereby be provided as fairly as possible to the consumers according to the priority order.

(5-2) Modified Example 1B

Figure 7:
FIG. 7 is an example of management information according to a modified example 1B of the present invention.

In the above embodiment, the allocation unit 112*e* allocates the demand adjustment amount to the lower-level controller 100 in the order in which the lower-level controller is registered in the management information 140*a*. However, in another embodiment, the number of times the demand adjustment amount has been allocated to each lower-level controller 100 may be recorded, and the plurality of lower-level controllers 100 may be listed in ascending order of the number of times of allocation for example, as in the management information 140*c* illustrated in FIG. 7, and the demand adjustment amount may be allocated according to that order. When it reaches to the last in the order, the demand adjustment amount is allocated after returning to the head. If there are a plurality of lower-level controllers 100 having the same number of times of allocation, the order of the lower-level controllers 100 having the same number of times of allocation is determined according to a descending order of the individual adjustable amount 120, an order in which the lower-level controllers are registered in the management information 140*c*, or another prescribed rule. The number of times of allocation recorded in the management information 140*c* is initialized to 0 when a prescribed period (for example, one year) elapses.

Opportunities to participate in demand response can thereby be provided as fairly as possible to the consumers.

(5-3) Modified Example 1C

In another embodiment, the demand adjustment amount may be allocated to the lower-level controller 100 in an order combining all of the above embodiments, that is, an order combining the order of registration, the order of priority order and the order of number of times of allocation, or an order combining any two or more of the above.

For example, the management information includes information related to the priority order pertaining to each lower-level controller 100 and information related to the number of times that the allocation unit 112e allocated the demand adjustment amount to each lower-level controller 100 in the past, and the allocation unit 112e allocates the demand adjustment amount to each lower-level controller 100 firstly according to an ascending order of the number of times allocation, secondly according to the order of priority order, and thirdly according to the order in which the lower-level controller is registered in the management information.

In another embodiment, a lower-level controller 100 of a consumer having cancelled participation in demand response in midcourse, and/or a lower-level controller 100 for which the individual adjustable amount 120 is 0 may be moved up in priority order, or otherwise and then the demand adjustment amount may be allocated them next time on a priority basis.

Opportunities to participate in demand response can thereby be provided as fairly as possible to the consumers.

(5-4) Modified Example 1D

In the above embodiment, the adjustment request period was a period specified by the demand adjustment request from the higher-level controller 90. However, in another embodiment, the adjustment request period may be a period determined by the lower-level controller 100 or the intermediate controller 110.

The lower-level controller 100 also may start suppression of the amount of energy consumption after a prescribed period (for example, 5 minutes) elapses after the demand adjustment request receiving unit 112d of the intermediate controller 110 receives the demand adjustment request from the higher-level controller 90, and may terminate suppression of the amount of energy consumption after the demand adjustment request receiving unit 112d receives a signal notifying the end of the adjustment request period from the higher-level controller 90.

(5-5) Modified Example 1E

In the above embodiment, in allocation processing, the demand adjustment amount is allocated by a prescribed amount to the lower-level controller 100 in the order in which the lower-level controller is registered in the management information 140a. However, in another embodiment, the demand adjustment amount may be allocated to each lower-level controller 100 by an amount of the individual adjustable amount 120 which each lower-level controller 100 gives notification to the intermediate controller 110.

In another embodiment, the demand adjustment amount may be allocated to all lower-level controllers 100 registered in the management information 140a. In this case, the demand adjustment amount allocated to each lower-level controller is adjusted, for example, by dividing the demand adjustment amount with the numbers of lower-level controllers 100, or the like.

(5-6) Modified Example 1F

In the above embodiment, in step S102 of the processing flow related to demand response, the total adjustable amount notification unit 112c causes the communication unit 111 to transmit the total adjustable amount via the communication network 81 to the higher-level controller 90. However, in another embodiment, the total adjustable amount may not be transmitted to the higher-level controller 90. In this case, in step S103 of the processing flow related to demand response, the higher-level controller 90 determines the requested suppressed amount of energy and the adjustment request period independently from the total adjustable amount transmitted from the intermediate controller 110 and the prescribed period according to step S101. Further, the requested suppressed amount of energy may not be included in the demand adjustment request transmitted from the higher-level controller 90 to the intermediate controller 110, and in this case, the intermediate controller 110 may determine the requested suppressed amount of energy on the basis of the total adjustable amount.

INDUSTRIAL APPLICABILITY

The present invention is applicable to an apparatus for compiling amounts of energy consumption being suppressible by each of a plurality of lower-level controllers.

What is claimed is:

1. An intermediate apparatus adapted to manage a plurality of lower-level apparatuses each of which manages one or more pieces of facility equipment, the intermediate apparatus comprising:
an intermediate controller including a memory unit and a control unit, the memory unit storm an intermediate controller program and lower-level apparatus management information related to each of the lower-level apparatuses, and the control unit being configured to execute the intermediate controller program stored in the memory unit,
the control unit including
an individual adjustable amount receiving unit programmed to receive notification of an individual adjustable amount of energy consumption per prescribed time period from each of the lower-level apparatuses;
a total adjustable amount calculation unit programmed to calculate a total adjustable amount of energy consumption of the plurality of lower-level apparatuses based on the individual adjustable amounts of the lower-level apparatuses;
a demand adjustment request receiving unit programmed to receive a demand adjustment request from an energy management apparatus, the demand adjustment request being a request to adjust an energy consumption of the plurality of lower-level apparatuses by an amount equal to or larger than a demand adjustment amount during an adjustment request period, the energy management apparatus being a higher-level apparatus;
an allocation unit programmed to allocate a prescribed portion of the demand adjustment amount to at least one of the lower-level apparatuses based on the demand adjustment request, the allocation unit allocating the prescribed portion according to a prescribed order based on the lower-level apparatus management information until a sum of the allocated prescribed portions reaches or exceeds the demand adjustment amount;
an individual request unit programmed to send an individual demand adjustment request to each of the at least one of the lower-level apparatuses to which the prescribed portion was allocated by the allocation unit, the individual demand adjustment request being a request to adjust an individual energy consumption of the at least one of the lower-level apparatuses by the prescribed portion of the demand adjustment amount; and a total adjustable amount notification unit programmed to provide notification of the total adjustable amount to the higher-level apparatus, the memory unit being further configured to store the individual adjustable amount of energy consumption per prescribed time period of each of the lower-level apparatuses, and update and store a pointer indicating the lower-level apparatus to which the scribed portion was last allocated when the allocation unit last allocated the prescribed portion to at least one of the lower-level apparatuses according to the prescribed order in response to a last demand adjustment request received by the demand adjustment request receiving unit, and the allocation unit being further programmed such that when the allocation unit allocates the prescribed portion to at least one of the lower-level apparatuses based on a new demand adjustment request, the allocation unit allocates the prescribed portion to the at least one of the lower-level apparatus according to the prescribed order, starting from the lower-level apparatus that immediately follows the lower-level apparatus indicated by the pointer as the lower-level apparatus to which the prescribed portion was last allocated.

2. The intermediate apparatus according to claim 1, wherein:

the prescribed order is an order in which the lower-level apparatuses are registered in the lower-level apparatus management information.

3. The intermediate apparatus according to claim 1, wherein:

the lower-level apparatus management information further includes information related to a priority order associated with each of the lower-level apparatuses; and the prescribed order is the priority order.

4. The intermediate apparatus according to claim 1, wherein:

the lower-level apparatus management information further includes information related to a priority order associated with each of the lower-level apparatuses, and information related to a number of times of allocation in which the allocation unit previously allocated the prescribed portion of demand adjustment amount to each of the lower-level apparatuses; and the prescribed order is one of an order in which the lower-level apparatuses are registered in the lower-level apparatus management information, the priority order, an ascending order of the number of times of allocation, and an order that is a combination of any two or more of the preceding orders.

5. An intermediate apparatus adapted to manage a plurality of lower-level apparatuses each of which manages one or more pieces of facility equipment, the intermediate apparatus comprising:

a intermediate controller including a memory unit and a control unit, the memory unit storing an intermediate controller program and lower-level apparatus management information related to each of the lower-level apparatuses, and the control unit being configured to execute the intermediate controller program stored in the memory unit, the control unit including an individual adjustable amount receiving unit programmed to receive notification of an individual adjustable amount of energy consumption per prescribed time period from each of the lower-level apparatuses;

a total adjustable amount calculation unit programmed to calculate a total adjustable amount of energy consumption of the plurality of lower-level apparatuses based on the individual adjustable amounts of the lower-level apparatuses;

a demand adjustment request receiving unit configured to receive a demand adjustment request from an energy management apparatus, the demand adjustment request being a request to adjust an energy consumption of the plurality of lower-level apparatuses by an amount equal to or larger than a demand adjustment amount during an adjustment request period, the energy management apparatus being a higher-level apparatus;

an allocation unit programmed to allocate a prescribed portion of the demand adjustment amount to at least one of the lower-level apparatuses based on the demand adjustment request, the allocation unit allocating the prescribed portion according to a prescribed order based on the lower-level apparatus management information until a sum of the allocated prescribed portions reaches or exceeds the demand adjustment amount;

an individual request unit programmed to send an individual demand adjustment request to each of the at least one of the lower-level apparatuses to which the prescribed portion was allocated by the allocation unit, the individual demand adjustment request being a request to adjust an individual energy consumption of the at least one of the lower-level apparatuses by the prescribed portion of the demand adjustment amount; and a total adjustable amount notification unit programmed to provide notification of the total adjustable amount to the higher-level apparatus, the memory unit being further configured to store the individual adjustable amount of energy consumption per prescribed time period of each of the lower-level apparatuses, and a number of times of allocation in which the allocation unit previously allocated the prescribed portion to each of the lower-level apparatuses, and the prescribed order being an ascending order of the number of times of allocation stored in the memory unit.

* * * * *